United States Patent

Hamano et al.

Patent Number: 5,610,660
Date of Patent: Mar. 11, 1997

[54] MULTIPLEXING SYSTEM FOR INSERTING SYNCHRONOUS WORDS TO PICTURE IMAGE CODED DATA

[75] Inventors: Takashi Hamano; Kiyoshi Sakai; Kiichi Matsuda, all of Kawasaki, Japan

[73] Assignee: Fujitsu Limited, Kanagawa, Japan

[21] Appl. No.: 404,245

[22] Filed: Mar. 15, 1995

[30] Foreign Application Priority Data

Mar. 16, 1994 [JP] Japan .................................. 6-072512

[51] Int. Cl.⁶ .............................. H04N 7/52; H04N 7/50
[52] U.S. Cl. ....................... 348/423; 348/390; 348/399; 348/405; 348/438
[58] Field of Search ................................... 348/423, 390, 348/399, 405, 438; 370/84

[56] References Cited

U.S. PATENT DOCUMENTS

| | | | |
|---|---|---|---|
| 5,410,355 | 4/1995 | Kolczynski | 348/438 |
| 5,467,139 | 11/1995 | Lankford | 348/512 |
| 5,521,927 | 5/1996 | Kim et al. | 370/94.2 |
| 5,537,409 | 7/1996 | Moriyama et al. | 370/84 |

FOREIGN PATENT DOCUMENTS

| | | |
|---|---|---|
| 0613300 | 8/1994 | European Pat. Off. . |
| 62-230281 | 10/1987 | Japan . |
| 2206970 | 8/1990 | Japan . |
| 4104662 | 4/1992 | Japan . |
| 4213987 | 8/1992 | Japan . |

*Primary Examiner*—Thai Q. Tran
*Assistant Examiner*—Frank Snow

[57] ABSTRACT

For an image data such as a motion picture image data composed of three hierarchical layers formed of slices, each of which having a plurality of macroblocks and one picture having a plurality of the slices, a synchronous word is adaptively inserted to each header of the slices and the picture according to a characteristic of the image data. It is possible to effectively perform the localization of errors. A synchronous word multiplexing system for coded image data inputs and codes image data, converts the coded data to a variable-length coded data, divides the image coded data into a plurality of data signals, and multiplies a synchronous word per a predetermined divided unit. Further, a timing signal for multiplexing synchronous words to the image coded data is generated based on a characteristic data, and the timing of multiplexing synchronous words is controlled based on characteristics of the image data.

13 Claims, 11 Drawing Sheets

MULTIPLEXING SYSTEM FOR INSERTING SYNCHRONOUS WORDS TO PICTURE IMAGE CODED DATA

BACKGROUND OF THE INVENTION

1. Field of the Invention

The present invention relates to a multiplexing system for inserting synchronous words to a coded data signal of motion picture image for transmission or recoding of the coded data signal.

2. Description of the Related Art

Figure 15:
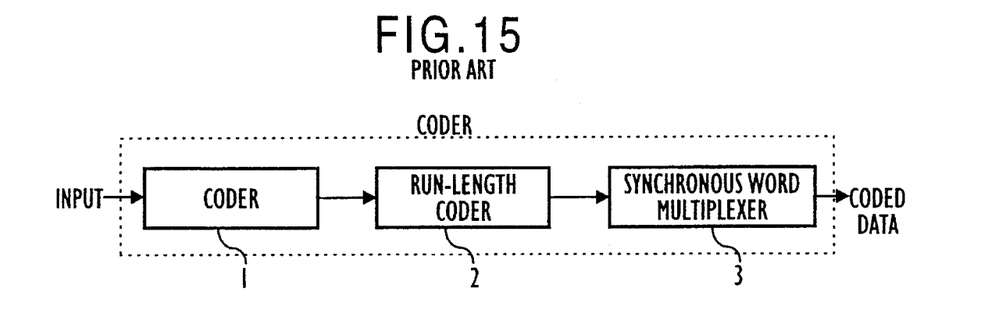
FIG. 15 is a diagram for explaining a structure of a prior art.

Referring now to FIG. 15, a general structural example of a conventional coding system is shown. In FIG. 15, a coder 1 takes a difference between an inputted motion picture image data signal from an information source and an estimated value, and efficiently codes the difference.

A run-length coder 2 codes the coded data signal outputted from the coder 1 to a run-length data signal to improve sufficient efficiency in coding.

A synchronous word multiplexer 3 divides the run-length data signal outputted from the run-length coder 2 into a plurality of data signals, inserts a synchronous word per each predetermined interval, and sends the data signal as a coded data signal or sends the data signal to a recorder.

It is general that it becomes necessary to code efficiently in this step, because data volume expands when a motion picture, more particularly, a motion picture image data is transmitted and recorded.

In coding means in order to code efficiently, a motion picture image data signal on one picture and a coded data signal have a hierarchical structure in general.

For example, Both MPEG-1 which is a standard to make a stored media as a main object and MPEG-2 which is a standard of a general coding system having high quality of next generation have a hierarchical structure explained as follows.

Figure 16:
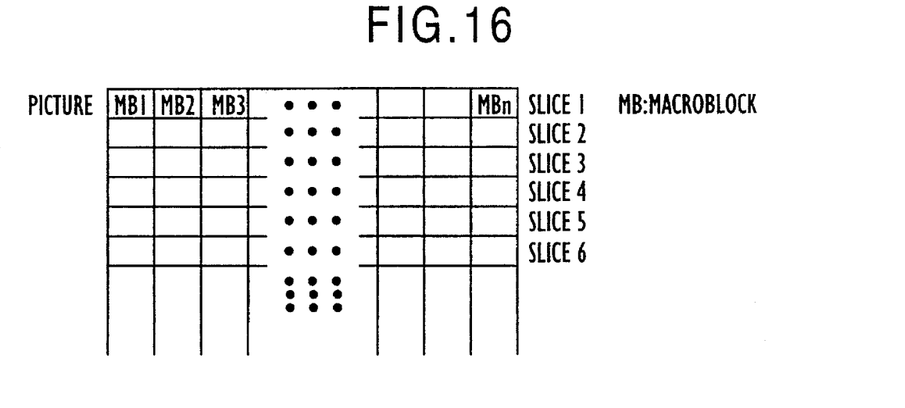
FIG. 16 is an explanatory diagram of a general motion picture image data signal.

A motion picture image data on one picture is composed of three layers of pictures, slices and macroblocks. FIG. 16 shows the three layers of the motion picture image data.

One picture is divided to a plurality of data signals. The picture is divided into a plurality of lines, such as slices 1 to n horizontally, and each slice is divided into a plurality of macroblocks, such as macroblocks MB1 to MBn.

Figure 17:
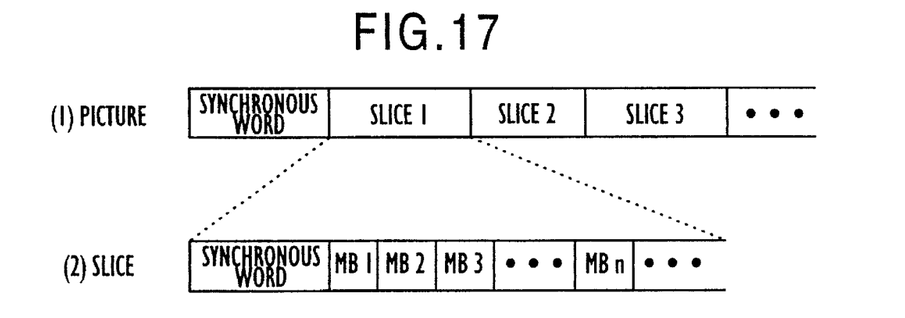
FIG. 17 is an explanatory diagram of a general coded data signal.

Synchronization of the coded data is established by synchronous words which are attached to each header of a picture and each slice, as shown in FIG. 17. (1) of FIG. 17 shows a structure in which a synchronous word is attached to a header of one picture. (2) of FIG. 17 shows a structure in which a synchronous word is attached to a header of each slice.

In FIG. 17, a length of each macroblock MB is different from those of other macroblocks, so that a length of each slice is also different from those of other slices, because a run-length coding is performed.

Slice size (number of macroblocks in one slice) can be set freely when coding, with due regard to a point of wide use. However, it was general to employ one macroblock line as one slice or fix the number of macroblocks in one slice, for simply coding/decoding in the conventional system. As described above, a synchronous word is attached to each header of a picture and each slice. Moreover, the synchronous word needs many bits in general, so that the number of synchronous words become larger when the slice size become shorter, thus causing deterioration of coding efficiency. Accordingly, it is desired to make the slice size longer as possible, with due regard to coding efficiency. However, it is preferably to make the slice size shorter, even if coding efficiency becomes lower, with due regard to localization of errors when the errors occur in the coded data.

SUMMARY OF THE INVENTION

Accordingly, it is an object of the present invention to provide a synchronous word multiplexing system for a motion picture image data in which a localization of errors can be effectively performed without steeply increasing synchronous words on one picture. It is another object of the present invention to provide a synchronous word multiplexing system for a motion picture image data in which a multiplexed unit to which a synchronous word is inserted can be controlled according to a characteristic of a localized spatial or/and time direction.

It is a further object of the present invention to provide a synchronous word multiplexing system for a motion picture image data in which a multiplexing unit to which a synchronous word is inserted can be controlled according to a localized coding mode.

It is a still further object of the present invention to provide a synchronous word multiplexing system for a motion picture image data in which a multiplexing unit, to which a synchronous word is inserted can be controlled according to a localized generated data amount.

A synchronous word multiplexing system for a motion picture image data according to the present invention to cope with the above-described objects comprising:

a first means for inputting and coding a picture image data;

a second means for converting a coded data outputted from the first means to a variable-length coded data;

a third means for dividing the variable-length coded data outputted from the second means into a plurality of coded data and multiplexing a synchronous word to each predetermined divided unit of the coded data;

a fourth means for extracting a localized characteristic of the picture image based on the coded data outputted from the first means; and a fifth means for generating a timing signal for multiplexing the synchronous word, based on the localized characteristic of the picture image extracted by the fourth means, and controlling a multiplexing timing of synchronous words in the third means.

Further, other objects of the present invention become clearly by the description of preferred embodiments referring to the drawings and the attached claims.

DESCRIPTION OF THE PREFERRED EMBODIMENT

Figure 1:
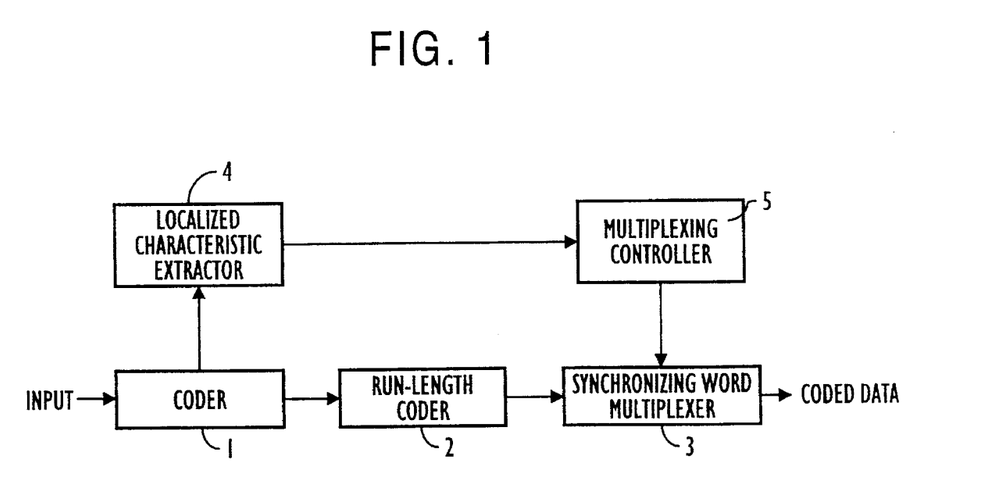
FIG. 1 is a principle diagram of the present invention.

FIG. 1 is a principle diagram of the present invention. Throughout the following descriptions, the same reference numerals are used to denote and identify corresponding or identical components.

In FIG. 1, a coder 1 for an information source has a coding function of converting an inputted analog image data signal to a digital data signal.

A run-length coder 2 makes a coded bit number of the coded signal outputted from the coder 1 variable to obtain sufficient efficiency in coding.

A synchronous word multiplexer 3 divides the run-length coded signal to a plurality of data signals, multiplexes the signals by inserting a synchronous word to each picture and each slice, and outputs a data signal as a coded data.

The coder 1, the run-length coder 2 and the synchronous word multiplexer 3 have the same structure and operations as those of the prior art, except functions provided according to the present invention, described later.

In FIG. 1, a localized characteristic extractor 4 and a multiplexing controller 5 are provided according to the present invention.

The localized characteristic extractor 4 takes out a data signal outputted from the coder 1, extracts a data signal relating to a localized characteristic of one picture therefrom, and sends the extracted data signal relating to a localized characteristic to the multiplexing controller 5.

The multiplexing controller 5 compares the data signal relating to a localized characteristic outputted from the extractor 4 with a threshold value, controls the synchronous word multiplexer 3 to insert a synchronous word when the data exceeds the threshold value.

Figure 2:
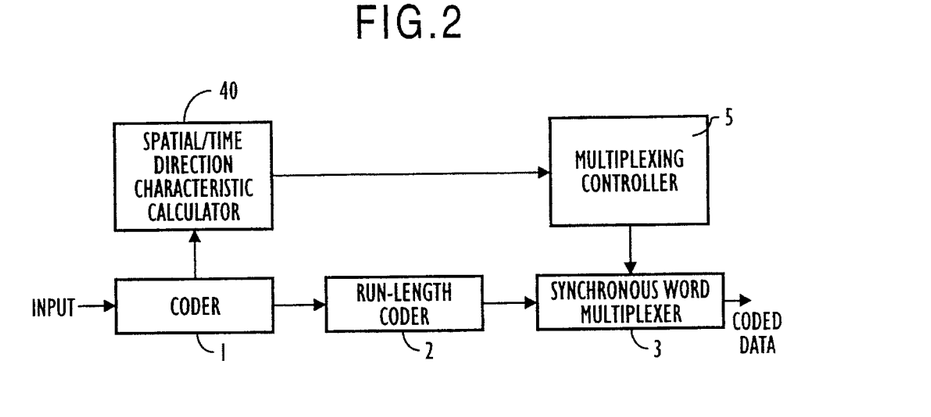
FIG. 2 is a diagram for explaining a concept of a first embodiment according to the present invention.

FIG. 2 is a block diagram for explaining the first embodiment to find a characteristic in a spatial and/or time direction as a localized characteristic for a basic conceptual structure according to the present invention shown in FIG. 1. In FIG. 2, a spatial/time direction characteristic calculator 40 is provided as a localized characteristic extractor 4.

Here, the case where one image picture has a static section and a dynamic section will be considered. For example, the static section is showing a static image such as sky as a background on the upper portion of the one image picture and the dynamic section is showing many cars driving on a road on the lower portion of the one image picture.

Considering now that complexity of the image picture localized in spatial direction or dynamic motion as activity, it is easily understood from the image picture that the activity is generated highly in the lower section on the image picture.

In the case where errors are generated in the upper section of which activity is lower, image picture deterioration caused by error can be easily suppressed by displaying a previous image picture.

However, image quality deterioration can not be suppressed well in the lower section on the image picture, even if the previous image picture can be displayed. Therefore, it becomes necessary to localize a range in which the errors propagate as possible.

Accordingly, the multiplexing controller 5 controls to insert synchronous words more frequently to the lower section in which activity is higher, by extracting a spatial and/or time direction characteristic, i.e., extent of the activity in the first embodiment according to the present invention.

Figure 3:
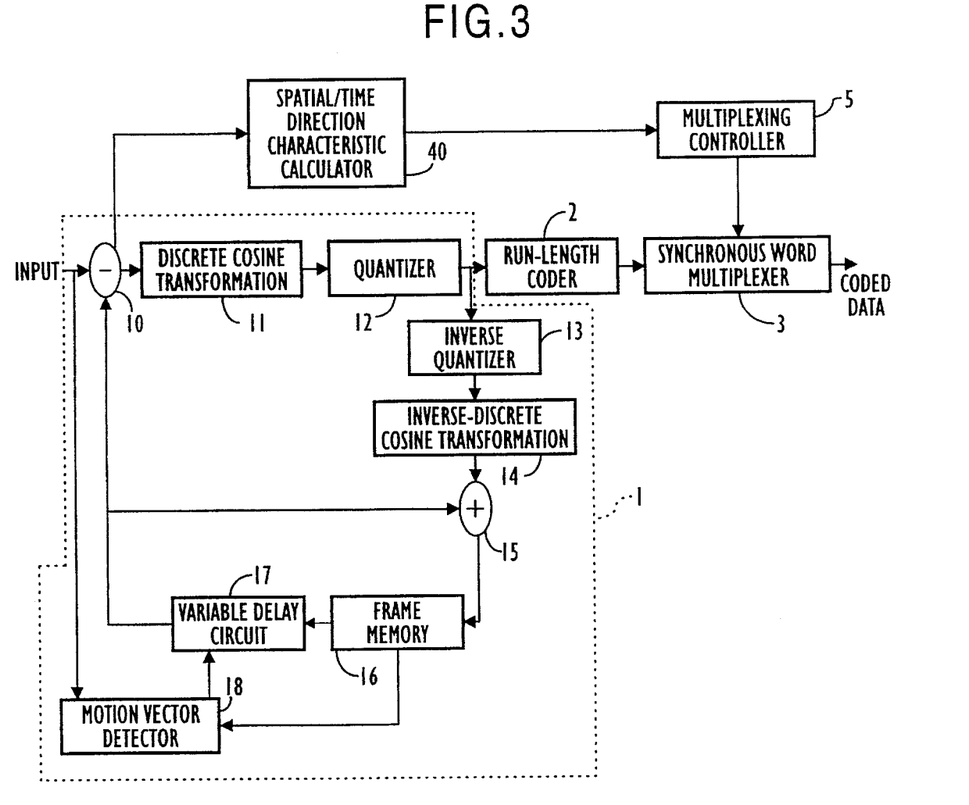
FIG. 3 is a block diagram of the first embodiment according to the present invention.

FIG. 3 is a structural block diagram of the first embodiment according to the present invention. In FIG. 3, the coder 1 employs a prediction coding system in which a difference between an inputted data signal and a prediction value is outputted and quantized.

The prediction coding system is also well-known as a conventional system. For example, a basic structure of the prediction coding system is shown in FIG. 3 on page 5 of CCITT recommendation H.261. On the coder 1, reference numeral 10 is a differential circuit for obtaining a difference between an inputted data signal and a prediction value.

The differential data signal outputted from the differential circuit 10 is subjected to DCT (Discrete Cosine Transformation) by a discrete cosine transformation circuit 11. After then, the data signal is quantized in a quantizer 12.

The output of the quantizer 12 is inputted to the run-length coder 2.

Meanwhile, the output of the quantizer 12 is inversely transformed to the data signal before quantizing, in an inverse-quantizer 13. Further, the data signal is subjected to inverse-DCT in an inverse discrete cosine transformation circuit 14 and led to an adder 15.

A frame memory 16 is a memory that stores image data signals required for one picture and has a buffer function to synchronize with the inputted motion picture image data.

The data signal outputted from the frame memory 16 becomes a prediction value through a variable delay circuit 17 and is inputted to the differential circuit 10 and also is inputted to the adder 15 to be accumulated.

An amount of motion vector is detected in a motion vector detector 18 based on the inputted image data signal and the data signal of the previous picture data signal stored in the frame memory 16. A delay amount in a variable delay circuit 17 is varied in correspondence with the detected amount of motion vector.

That is, the motion vector detector 18 controls the delay amount of the variable delay circuit 17 so that the data in an area in which a difference is smallest is detected from the inputted image data signal and the previous image data signal stored in the frame memory 16.

The prediction coder 1 and the differential signal outputted from the differential circuit 10 are employed to calculate a characteristic of the spatial/time direction. In the embodiment shown in FIG. 3, a characteristic in the spatial and/or time direction is calculated by performing a distributing calculation of macroblocks according to an inputted differential data signal as the spatial/time direction characteristic calculator 40.

The spatial/time direction characteristic calculator 40 can be easily realized by providing a micro-controller for performing the calculation with a software according to the operation flow chart, explained later, or performing the calculation with a hardware circuit.

Figure 4:
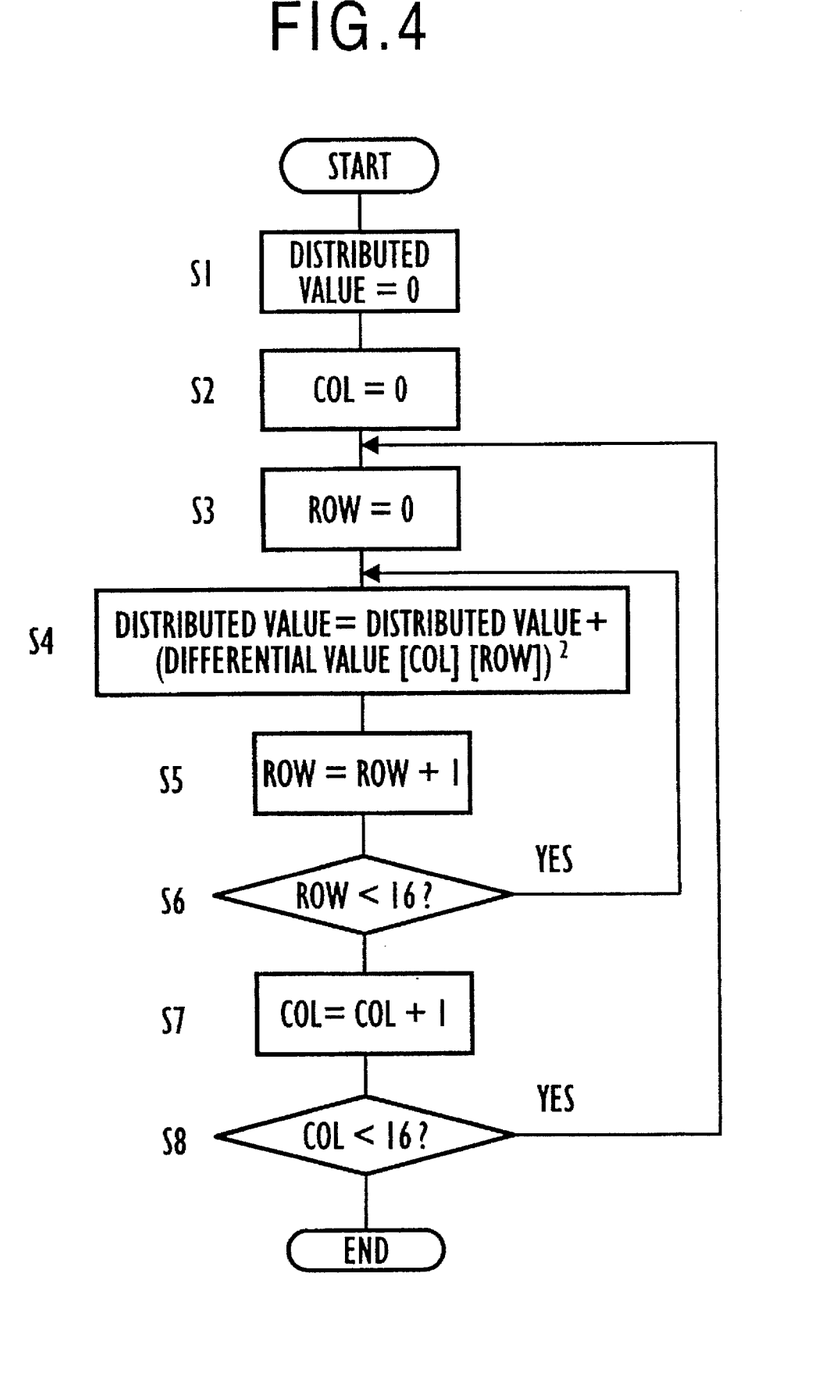
FIG. 4 is an operation flow chart (No. 1) of the first embodiment.

That is, the definite contents of distributing calculation of macroblocks are shown in the operation flow chart shown in FIG. 4. In FIG. 4, it is now considered that one picture image is divided to 16×16 macroblocks.

At first, the distributed value is set to "0" (STEP S1). Further, the value of column is set to "0" (STEP S2). Similarly, the value of row is set to "0" (STEP S3), and a macroblock MB1 is selected (refer to FIG. 16).

Then, a differential value is self-multiplied for each pixel composing a macroblock MB1, and the self-multiplied value added to the previous differential value, is updated and is set as a new distributed value (STEP S4).

Next, "1" is added to the value of row and the added row value is set as a new row value (STEP S5). The above-described operation is continued until the row becomes 16 (STEP S6).

After then, "1" is added to the value of column, and the added column value is set as a new column value (STEP S7). Similarly, the Steps S5 and S6 is continued until the column becomes 16 (STEP S8).

The self-multiplication of the differential value of 16×16 macroblocks obtained in this way is inputted to the multiplexing controller 5 as a distributed value of macroblocks.

Figure 5:
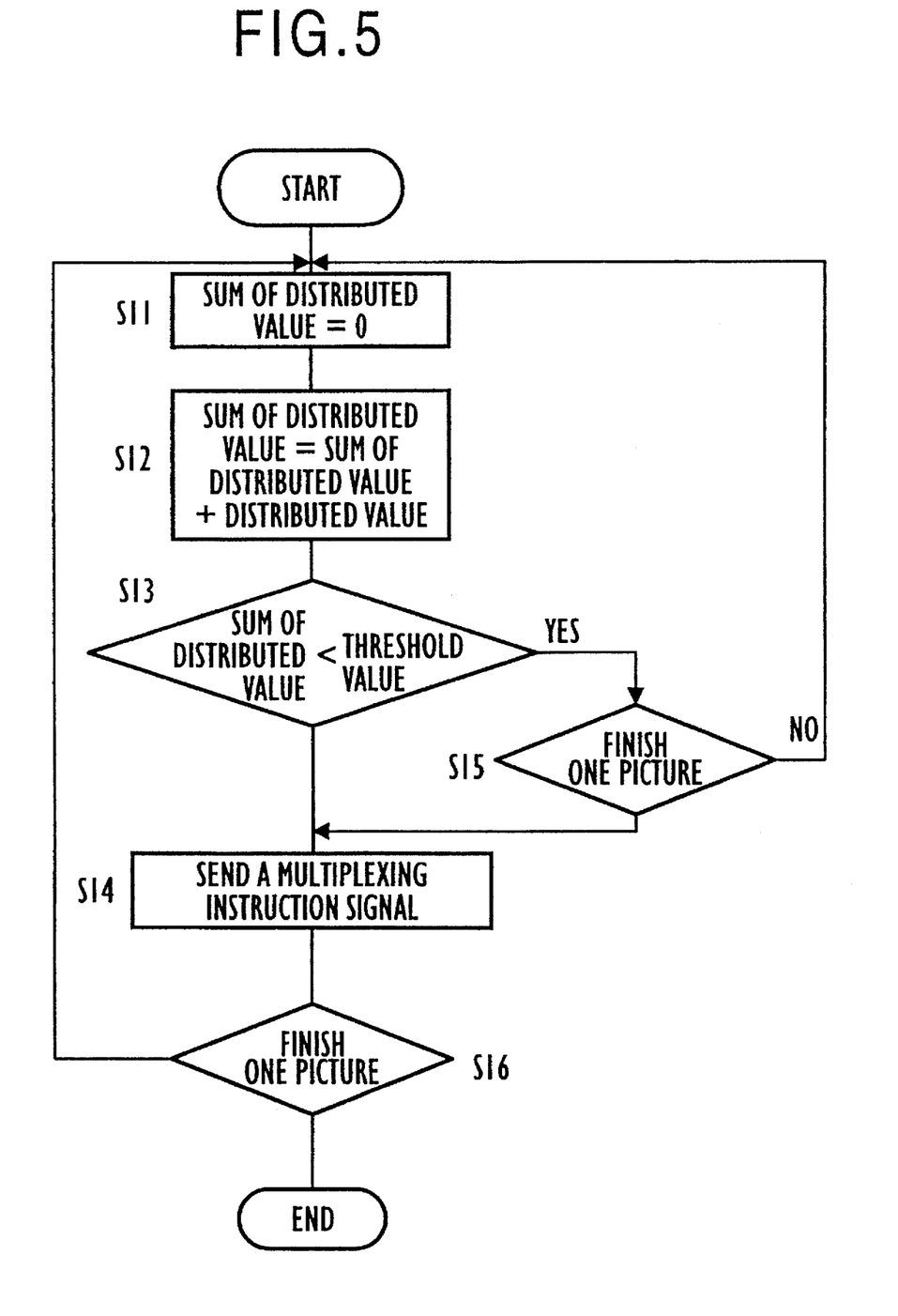
FIG. 5 is an operation flow chart (No. 2) of the first embodiment.

FIG. 5 is an operation flow chart of the multiplexing controller 5 for generating a control signal which controls a synchronous word multiplexer 3 according to the inputted distributed value. Similarly, the multiplexing controller 5 can be formed by employing a micro-controller for performing the calculation with a software or performing the calculation with a hardware circuit.

The sum of distributed value is set to "0" (STEP S11).

Then, the distributed value added to the inputted distributed value is updated and set as a new distributed value (STEP S12).

After then, it is judged whether or not the sum of the updated distributed value exceeds a threshold value (STEP S13), and the multiplexing instruction signal is sent out in the case where the sum of the distributed value exceeds the threshold value (STEP S14).

In the case where the sum of the distributed value does not exceed the threshold value, the sum of distributed value is added until finishing one picture (STEP S15).

In the case where one picture is finished, a multiplexing instruction data signal is sent out to insert a synchronous word of picture (STEP S14).

Figure 6:
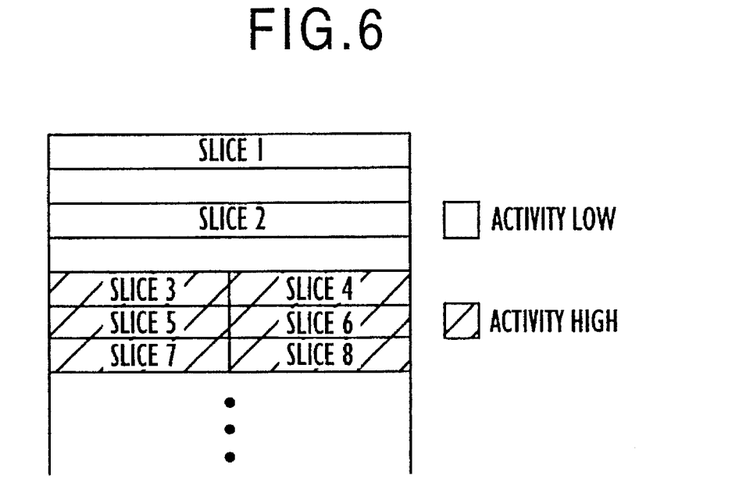
FIG. 6 is an explanatory diagram of an image data signal in the first embodiment.
Figure 7:
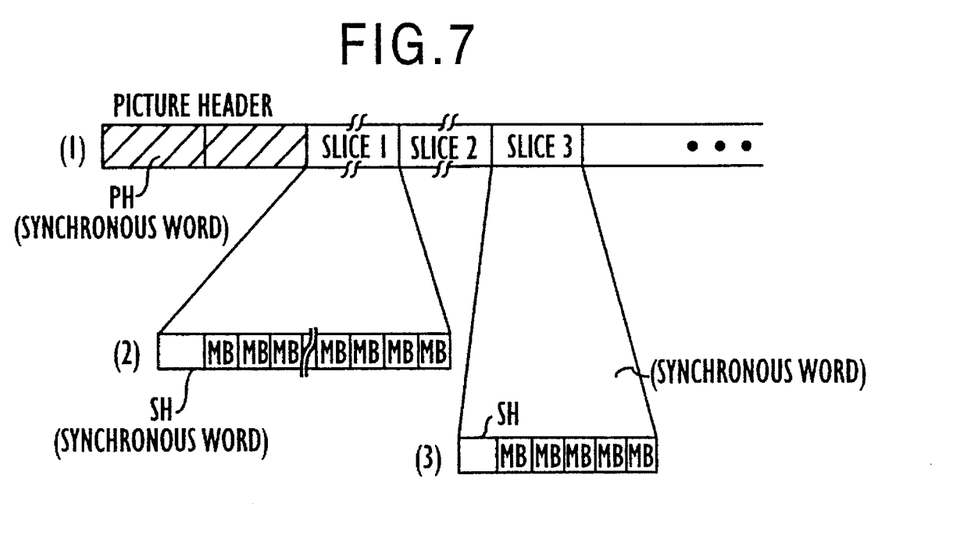
FIG. 7 is an explanatory diagram of a coded data signal in the first embodiment.

In this way, the synchronous word multiplexer 3 inserts the synchronous word based on the multiplexing instruction data signal outputted from the multiplexing controller 5, as shown in FIGS. 6 and 7.

FIG. 6 is an explanatory diagram of an image data of the first embodiment. A picture composing one picture image is divided into a plurality of slices. In FIG. 6, slices 1 and 2 indicate the upper section of a picture image, i.e., an area in which activity is low.

Meanwhile, slices 3 to 8 indicate the lower section of the image picture, i.e., an area in which activity is high.

FIG. 7 is a structural example of coded data of the image picture data. That is, one synchronous word PH is attached to a picture header [refer to (1) of FIG. 7], and a synchronous word SH is attached to each of a plurality of slices 1 to n [refer to (2) and (3) of FIG. 7].

In comparison of (2) of FIG. 7 with (3) of FIG. 7, it can be understood the number of macroblocks MB of the slice 1 on the upper portion of the picture image is more than that of the macroblock MB of the slice 3 on the bottom portion of the picture image.

The number of macroblocks MB included in the slice 1, i.e., the length of the slice formed by inserting a synchronous word is determined by a localized characteristic data signal outputted form the localized characteristic extractor 4, according to the present invention as described above. In the embodiment shown in FIG. 2, it is determined by the partial and/or time direction characteristic.

Figure 8:
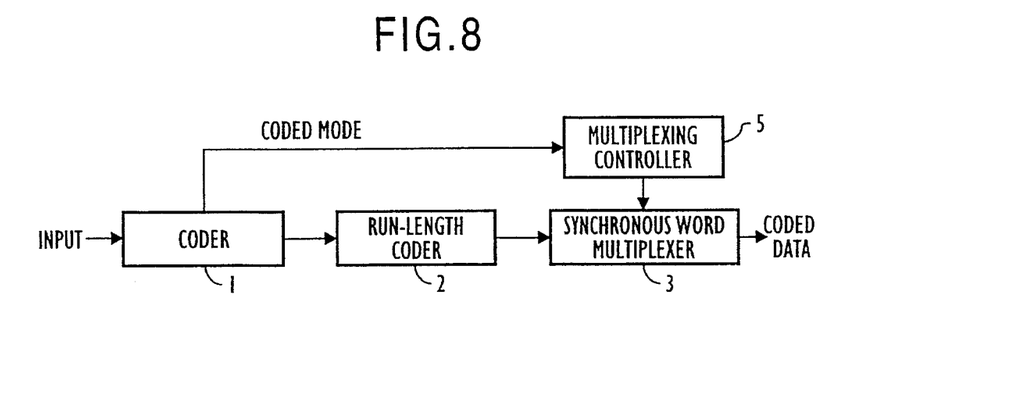
FIG. 8 is a diagram for explaining a concept of the second embodiment according to the present invention.

FIG. 8 is an explanatory diagram of the second embodiment according to the present invention.

In the second embodiment, a data signal showing a coded mode outputted from the coder 1 is extracted and inputted to the multiplexing controller 5. The multiplexing controller 5 controls the synchronous word multiplexer 3 to insert synchronous words based on the data signal showing the outputted coded mode.

A principle for controlling multiplexing of synchronous words with the coded mode will be explained as follows. According to the above-explained example, the upper section of an image picture is static and activity is low, and the lower section is dynamic and activity is high. Therefore, it is considered that a difference coding between frames as a coded mode is performed to the upper section of an image picture, and a difference coding within a frame as a coded mode is performed to the lower section of an image picture.

This is because the difference coding within a frame is executed in the case where activity is very high or the case where periodical refreshing occurs on an image picture. Therefore, it is required to localize a range of propagating errors in this section as possible.

The multiplexing controller 5 according to the second embodiment can be easily formed by providing a micro-controller for performing the calculation with a software or performing the calculation with a hardware circuit, according to the next explained operation flow chart.

Figure 9:
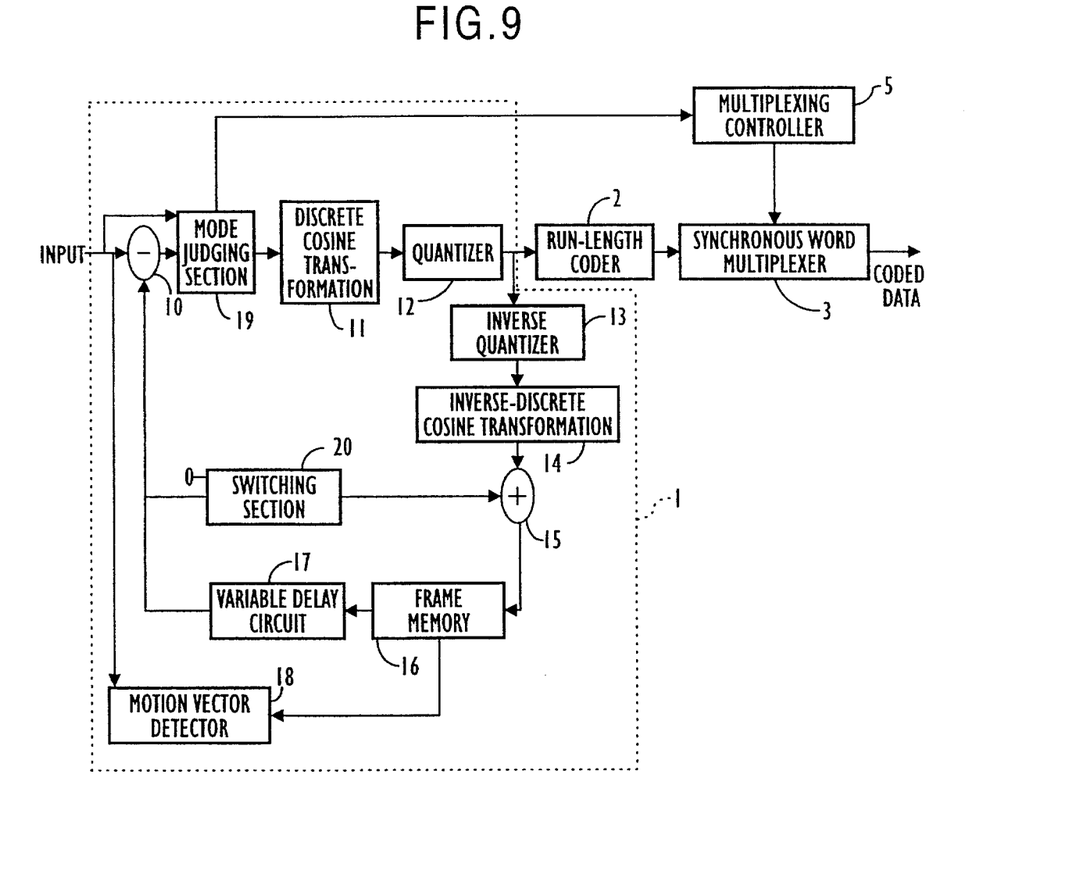
FIG. 9 is a block diagram of the second embodiment according to the present invention.

FIG. 9 is a detailed block diagram of the embodiment corresponding to FIG. 8.

The coder 1 employs a prediction coding system as well as the case explained according to the first embodiment. However, as shown in FIG. 9, a mode judging section 19 is provided in the coder 1 in the second embodiment.

The mode judging circuit 19 judges for an inputted image picture data signal, which coding mode needs a larger coding amount of bits, the difference coding between frames, i.e., INTER mode coding or the difference coding within a frame, i.e., INTRA mode coding, and has a function of controlling to switch the data signal inputted to the discrete cosine transformation circuit 11 and controlling the switching section 20.

These functions correspond to a coding control circuit in the principle structure shown in FIG. 3 on page 5 of CCITT recommendation H. 261.

In FIG. 9, the mode judging circuit 19 further judges whether a difference coding within a frame or a difference coding between frames should be employed, sends the data signal showing the coding mode judged to the multiplexing controller 5, and controls the synchronous word multiplexer 3 to insert a synchronous word.

Similarly, the mode judging circuit 19 controls the switching section 20 not to set "0" as an initial value and store in the adder 15 when the difference coding within a frame is selected.

Figure 10:
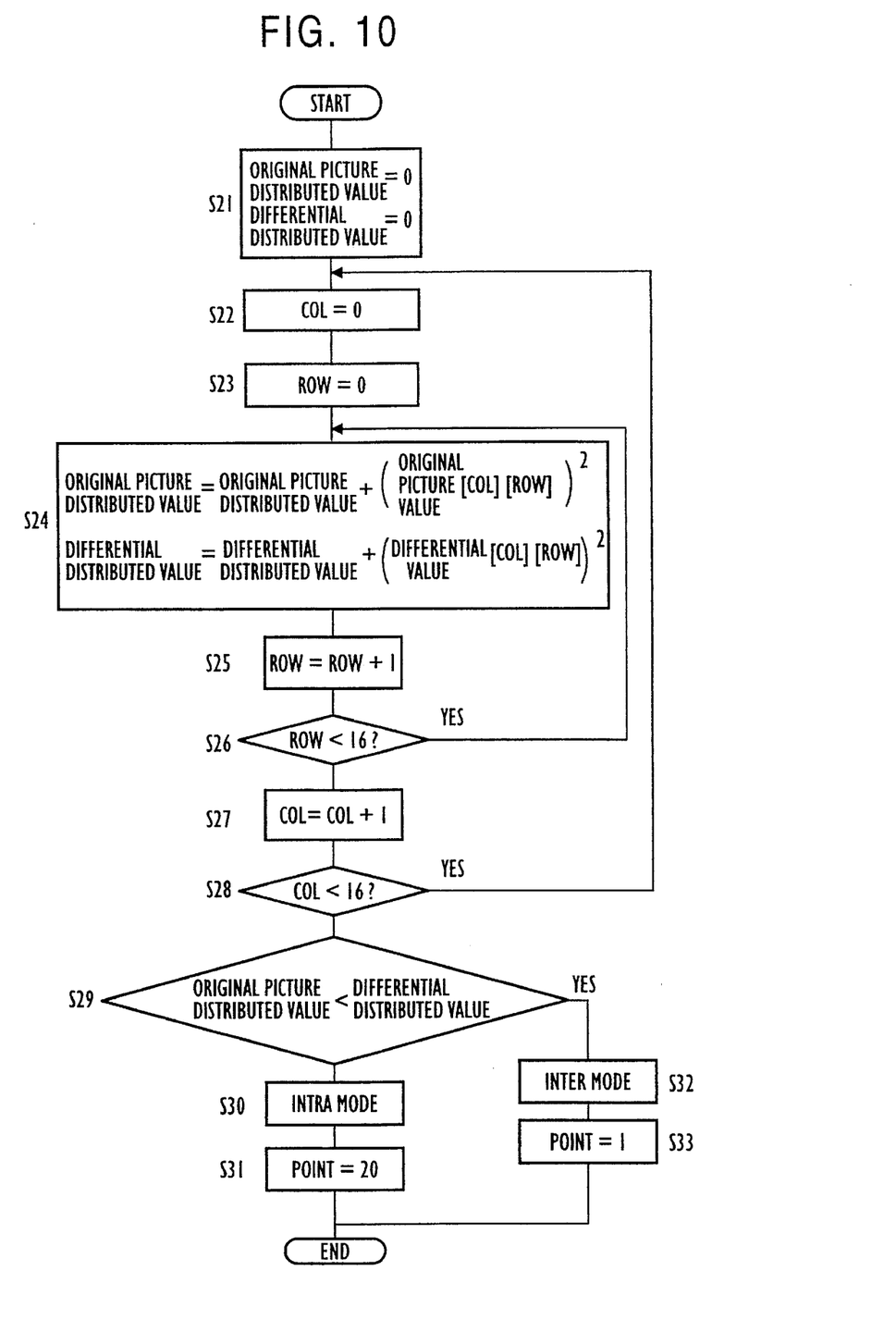
FIG. 10 is an operation flow chart (No. 1) of the second embodiment.

FIG. 10 is an operation flow chart for determining a coding mode in the mode judging circuit 19. In FIG. 10, it is supposed that macroblocks are 16×16.

At first, an original picture distributed value and a differential distributed value are set to "0", respectively (STEP S21).

An original picture distributed value is a value which is obtained by accumulating a difference that each pixel domain has, as compared with an average signal level in a frame. Meanwhile, differential distributed value is a value which is obtained by accumulating a difference of an image picture signal between frames.

Next, a column of macroblocks is set to "0" (STEP S22). Similarly, a row of macroblocks is set to "0" (STEP S23).

Then, the original picture distributed value is self-multiplied, the self-multiplied value is added to the previous original picture distributed value, and the added value is updated as a new original picture distributed value. Similarly, a differential signal between frames is self-multiplied, the self-multiplied value is added to the previous differential distributed value, and the added value is updated as a new differential distributed value (STEP S24).

After then, 1 is added to the value of the row, and added row value is updated as a new row value (STEP S25). The above-described steps are continued until the row becomes 16 (STEP S26).

Next, 1 is added to the value of the column, and the added row value is updated as a new column value (STEP S27). Therefore, the operation is continued until the column becomes 16 (STEP S28).

Then, it is judged whether or not the original picture distributed value is larger than the differential distributed value (STEP S29). In the case where the original distributed value is larger than the differential distributed value, set to the INTRA-mode to be a difference coding within a frame (STEP S30). Then, point is set to "20" (STEP S31).

Meanwhile, in the case where the original picture distributed value is smaller than the differential distributed value, set to the INTER mode to be a difference coding between frames (STEP S32). Then, the point is set to "1" (STEP S33).

Figure 11:
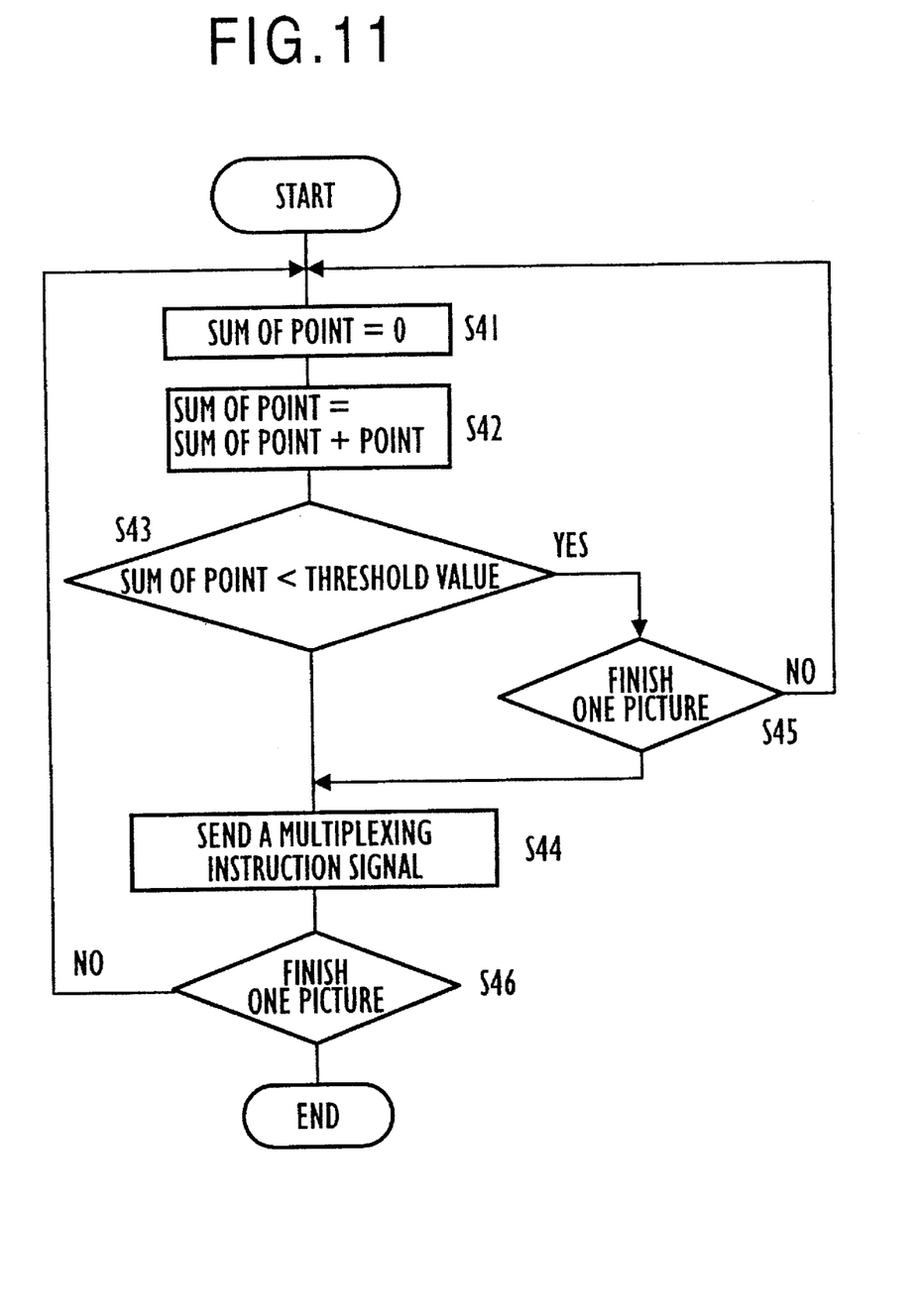
FIG. 11 is an operation flow chart (No. 2) of the second embodiment.

FIG. 11 shows an operation flow chart for controlling the synchronous word multiplexer 3 to control points obtained in the mode judging circuit 19, based on the received point in the multiplexing controller 5 in this way.

At first, the sum of points is set to "0" (STEP S41). Then, the transmitted point is added to the sum of points, and the added point is updated as a new sum of points (STEP S42).

After then, it is judged whether or not the sum of points exceeds the threshold value (STEP S43). In comparison of the sum of points with the threshold value, in the case where one picture is finished when the sum of points exceeds the threshold value, the multiplexing instruction is sent out (STEPs S45 and S44). That is, the multiplexing signal is sent out to insert the synchronous signal to a picture header.

Meanwhile, in the case where the sum of points exceeds the threshold value, a synchronous word is attached at this time, and the multiplexing instruction signal is sent out (STEP S44). This operation is continued until one picture is finished (STEP S46).

Further, it is supposed that the point of 20 is set as a threshold value. In the case of a difference coding within a frame, the multiplexing instruction signal is inserted per one macroblock. Meanwhile, in the case of a coding a difference between frames, the multiplication instructing signal is inserted per 20 macroblocks.

The multiplexing instruction signal generated in the multiplexing controller 5 is led to a synchronous word multiplexer 3, and the synchronous words are inserted as shown in FIGS. 6 and 7, as well as the case of the first embodiment.

Figure 12:
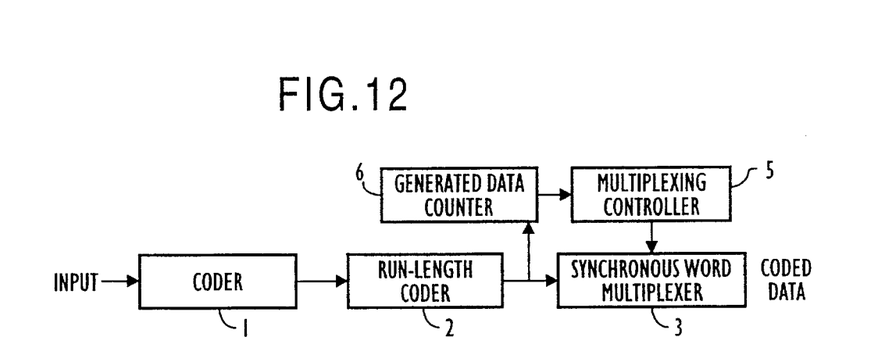
FIG. 12 is a diagram for explaining a concept of the third embodiment according to the present invention.

FIG. 12 is a block diagram for explaining the third embodiment according to the present invention.

In the third embodiment, the coder 1 includes a counter 6 that counts generated data. The amount of generated data counted in this counter 6 is sent to the multiplexing controller 5.

An inserting instruction signal of synchronous words is sent to the synchronous word multiplexer 3, by judging a timing to insert synchronous words according to the sent generated data in the multiplexing controller 5.

Figure 13:
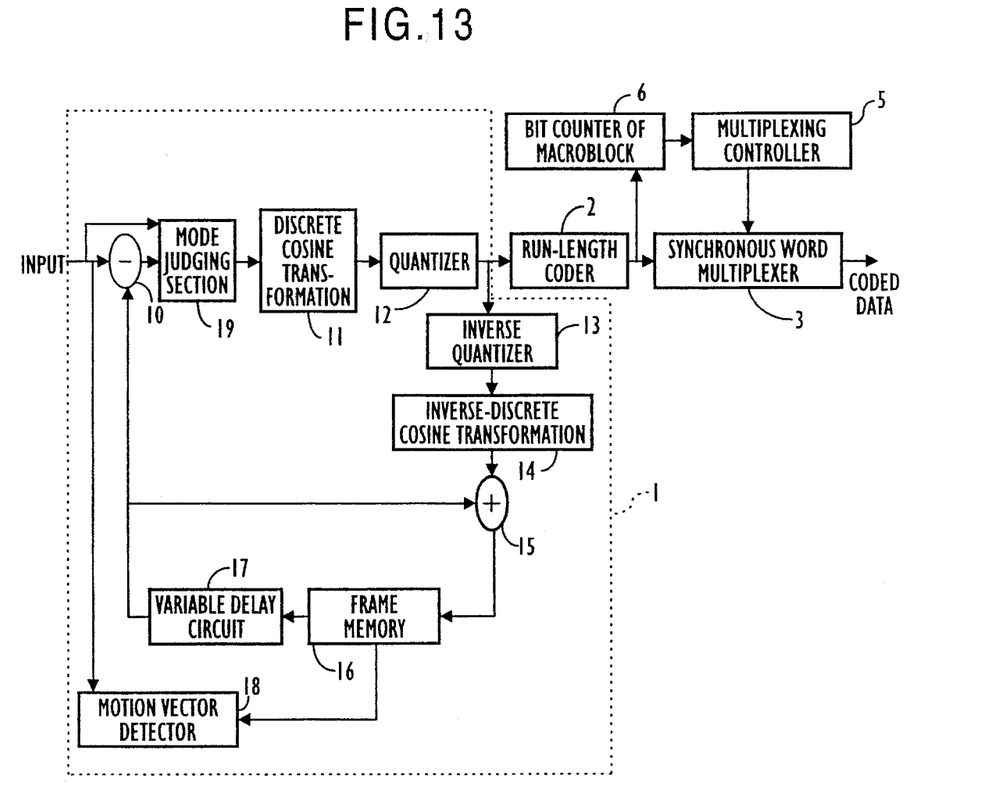
FIG. 13 is a block diagram of the third embodiment according to the present invention.

FIG. 13 is a detailed block diagram of the embodiment shown in FIG. 12.

In the embodiment shown in FIG. 13, the data counter 6 is connected to the run-length coder 2 and is formed of a counter for counting bits of a macroblock.

The multiplexing controller 5 employed in the third embodiment can be realized by providing a micro-controller for performing the calculation with a software or performing the calculation with a hardware circuit, according to the operation flow chart explained later.

In FIG. 13, the coder 1 of the present embodiment employs a prediction coding system as well as the cases of the first and second embodiments. The run-length coder 2 and a synchronous word multiplexer 3 have the same structure as those of the first and second embodiments.

Figure 14:
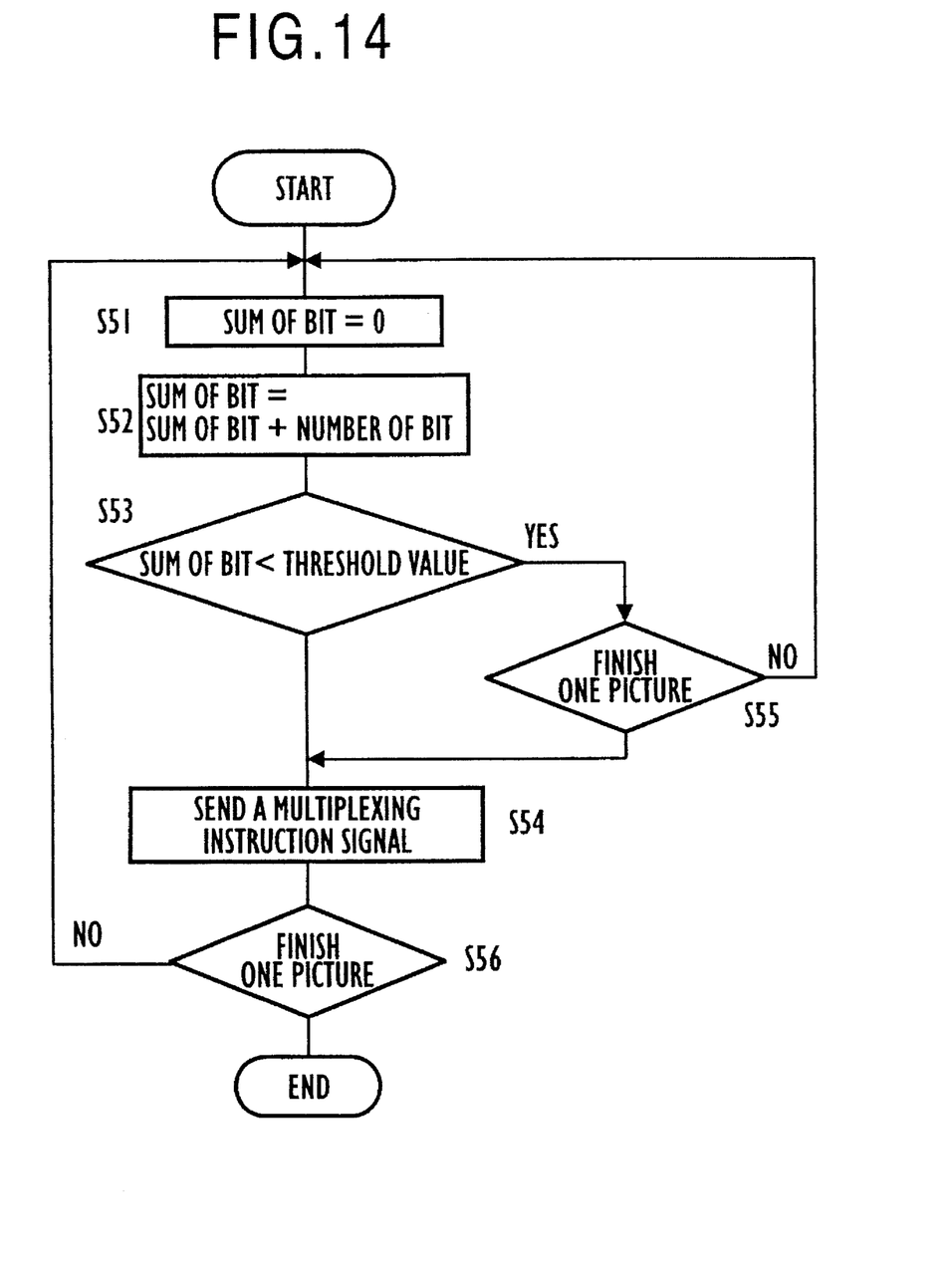
FIG. 14 is an operation flow chart of the third embodiment.

FIG. 14 is an detailed operation flow chart of the third embodiment.

At first, the sum of bits is set to "0" (STEP S51). Then, the bit number outputted from the run-length coder 2 is counted and the counted bit number is added to the sum of bit number, and the added bit number is updated as a new sum of bits (STEP S52).

Then, the sum of bit number is compared with the threshold value (STEP S53). In the case where the sum of bits does not exceed the threshold value, and one picture is finished (STEP S55), the multiplexing instruction signal is sent out (STEP S54). The above-described steps are continued until one image picture is finished (STEP S56).

It is required to control the bit number in a slice to be almost constant according to the object of a synchronous word, with regard due to that a synchronous word is attached per each slice as shown in (2) of FIG. 17.

For the demand, in the third embodiment, it is possible that a slice is composed of a constant number of bits by comparing the threshold value and the sum of bits.

In the section in which activity is higher on one image picture, the amount of generated data is large in general, so that the number of macroblocks included in one slice becomes small. In the section in which activity is lower on one image picture, the amount of generated data is small in general, so that the number of macroblocks included in one slice becomes large.

Accordingly, a same effectiveness is brought in the third embodiment as well as the case of the first embodiment, because a feed-back control in employed. Further, if the coded data has a fixed bit rate, it is easily realized that slices for a constant interval can be kept constantly in the third embodiment.

As explained according to the above-described embodiments, a localized characteristic of one image picture is extracted, and a signal for controlling the multiplexing of synchronous words is outputted, according to the present invention.

It becomes possible to adaptively insert and multiplex synchronous word with the control signal.

Consequently, it is also possible to effectively perform the localization of errors without steeply increasing synchronous words on an image picture.

The above embodiments are to be considered in all respects as illustrative, and the present invention is not restricted to the embodiments. The scope of the present invention is determined by the appended claims and all changes which come within the meaning and equivalency of the claims are therefore intended to be embraced in the scope of the present invention.

What is claimed is:

1. A synchronous word multiplexing system for coded image data comprising:

a first means for inputting and coding a picture image data;

a second means for converting a coded data outputted from the first means to a variable-length coded data;

a third means for dividing the variable-length coded data outputted from the second means into a plurality of coded data and multiplexing a synchronous word to each predetermined divided unit of the coded data;

a fourth means for extracting a localized characteristic of the picture image based on the coded data outputted from the first means; and a fifth means for generating a timing signal for multiplexing the synchronous word, based on the localized characteristic of the picture image extracted by the fourth means, and controlling a multiplexing timing of synchronous words in the third means.

2. A synchronous word multiplexing system for coded image data according to claim 1, wherein the picture image data is a motion picture image data which is composed of three hierarchical layers formed of slices, each of which having a plurality of macroblocks and one picture having the plurality of slices.

3. A synchronous word multiplexing system for coded image data according to claim 2, wherein a synchronous word is inserted to each header of the slices and the picture.

4. A synchronous word multiplexing system for coded image according to claim 1, wherein the fourth means extracts a characteristic of spatial and/or time direction of the coded image data.

5. A synchronous word multiplexing system for coded image data according to claim 4, wherein the first means employs a prediction coding method of coding a difference between a prediction value and an inputted signal, accumulates coded differences and outputs an accumulated differential value as a characteristic of the spatial and/or time direction of the coded image data and the fifth means controls the third means to insert synchronous words, when the accumulated differential value exceeds a predetermined threshold value.

6. A synchronous word multiplexing system for coded image data according to claim 4, wherein the first means employs a prediction coding method of coding a difference between a prediction value and an inputted signal, judges for inputted coded image data whether a coding amount is smaller in either one of modes for coding a difference between frames or for coding a difference in a frame, and selects and outputs the signal indicating the coding mode in which the coding amount is smaller, and the fifth means controls the third means to insert more synchronous words than that in the mode of a difference coding between frames, when a selected coding mode is a difference coding within a frame.

7. A synchronous word multiplexing system for coded image data according to claim 1, wherein the fourth means extracts a coding mode for a localized picture image.

8. A synchronous word multiplexing system for coded image data according to claim 6, wherein the picture image data is a motion picture image data, which is composed of three hierarchical layers formed of slices, each of which having a plurality of macroblocks and one picture having a plurality of slices.

9. A synchronous word multiplexing system for coded image data according to claim 6, wherein a synchronous word is inserted to each header of the slices and the picture.

10. A synchronous word multiplexing system for coded image data comprising:

a first means for inputting and coding an image data;

a second means for converting a coded data outputted from the first means to a variable-length coded data;

a third means for dividing the variable-length coded data outputted from the second means into a plurality of coded data and multiplexing a synchronous word to each predetermined divided unit of the coded data;

a fourth means for counting the variable-length coded data outputted from the second means;

a fifth means for generating a timing signal for multiplexing the synchronous word, based on the counted value outputted from the fourth means, and controlling a multiplexing timing of synchronous words in the third means.

11. A synchronous word multiplexing system for coded image data according to claim 10, wherein the variable-length coded data is inputted to the fourth means from the second means is inputted, the fourth means counts the number of bits of variable-length coded data, and the fifth means outputs a timing signal for multiplexing a synchronous word when a counted bit number from the fourth means exceeds a threshold value.

12. A synchronous word multiplexing system for coded image data according to claim 10, wherein the image data is a motion picture image data which is composed of three hierarchical layers formed of slices, each of which having a plurality of macroblocks and one picture having a plurality of the slices.

13. A synchronous word multiplexing system for coded image data according to claim 12, wherein a synchronous word is inserted to each header of the slices and the picture.

* * * * *